(12) United States Patent
Zheng et al.

(10) Patent No.: US 11,308,988 B2
(45) Date of Patent: Apr. 19, 2022

(54) HOLOGRAPHIC MULTIPLEXED RECORDING METHOD FOR INCREASING STORAGE CAPACITY

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/135,287

(22) Filed: Dec. 28, 2020

(65) Prior Publication Data

US 2021/0201950 A1    Jul. 1, 2021

(30) Foreign Application Priority Data

Dec. 31, 2019  (CN) .......................... 201911416177.9

(51) Int. Cl.
| | |
|---|---|
| *G11B 7/0065* | (2006.01) |
| *H04N 5/89* | (2006.01) |
| *G11B 7/08* | (2006.01) |
| *G03H 1/26* | (2006.01) |

(52) U.S. Cl.
CPC .............. *G11B 7/083* (2013.01); *G03H 1/265* (2013.01)

(58) Field of Classification Search
CPC ........ G11B 7/0065; G11B 2007/00658; G11B 2220/2504; G11B 2007/00653; H04N 5/89
USPC .......................................................... 369/103
See application file for complete search history.

(56) References Cited

U.S. PATENT DOCUMENTS

| | | | | |
|---|---|---|---|---|
| 6,700,686 B2* | 3/2004 | King | ......................... | G03H 1/02 |
| | | | | 359/10 |
| 8,305,863 B2* | 11/2012 | Tatsuta | .................... | G11B 7/083 |
| | | | | 369/103 |
| 2005/0088947 A1* | 4/2005 | Ichihara | ............... | G11B 7/0065 |
| | | | | 369/103 |
| 2010/0054103 A1* | 3/2010 | Tatsuta | ................. | G11B 7/1362 |
| | | | | 369/103 |
| 2010/0246367 A1* | 9/2010 | Okano | .................... | G11B 7/083 |
| | | | | 369/103 |

* cited by examiner

*Primary Examiner* — Nabil Z Hindi (74) *Attorney, Agent, or Firm* — Muncy, Geissler, Olds & Lowe, P.C.

(57) ABSTRACT

A holographic multiplexed recording method for increasing storage capacity is disclosed. In a holographic recording and reproducing device, the moving direction of a storage medium is not coplanar with the plane where the optical axes of signal light and reference light are located, or the relative moving direction of the storage medium and the signal light or the reference light is not coplanar with the plane where the optical axes of the signal light and the reference light are located. Through the method, a certain angle exists between the grating vector direction and the moving direction or the relative moving direction, so that the phenomenon that the grating vector directions are the same does not occur when the medium is subjected to multiplexed recording after being rotated or flipped. Not only is multiplexing number increased, but also crosstalk caused by the same grating vector direction is prevented.

16 Claims, 10 Drawing Sheets

HOLOGRAPHIC MULTIPLEXED RECORDING METHOD FOR INCREASING STORAGE CAPACITY

CROSS REFERENCE TO RELATED APPLICATIONS

The present application claims priority from Chinese Patent Application No. 201911416177.9 filed on Dec. 31, 2019, all of which are hereby incorporated herein by reference.

TECHNICAL FIELD

The present invention relates to the field of optical storage technologies, and in particular, to a holographic multiplexed recording method for increasing storage capacity, a storage medium and a holographic recording and reproducing device.

BACKGROUND

Holographic storage technology is a large-capacity optical storage technology that records input information in the form of a hologram on a storage medium by using the principle of laser interference. The signal light and reference light carrying the input information are incident into the holographic storage medium at a fixed angle, so that the signal light and the reference light meet in the medium and interfere to generate a hologram. The light intensity distribution of the hologram is used to make the refractive index of the storage medium change accordingly, so as to record the hologram. This is an information recording process. When reading, the signal light is blocked, the reference light is diffracted after being incident into the storage medium, the diffracted light carries a signal and is projected to a detector along the original signal light direction, and the detector reads the signal.

Figure 1:
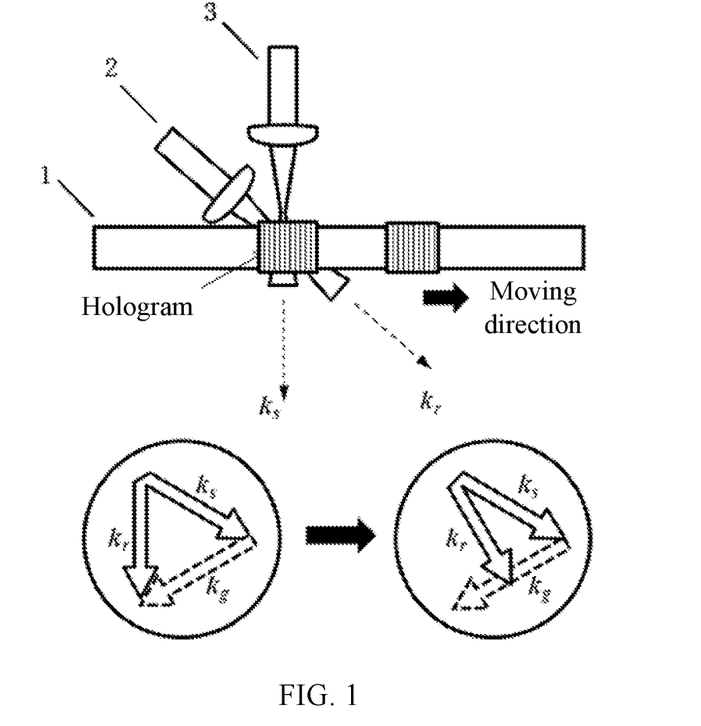
FIG. 1 illustrates the principle of a shift multiplexed recording method.
Figure 2:
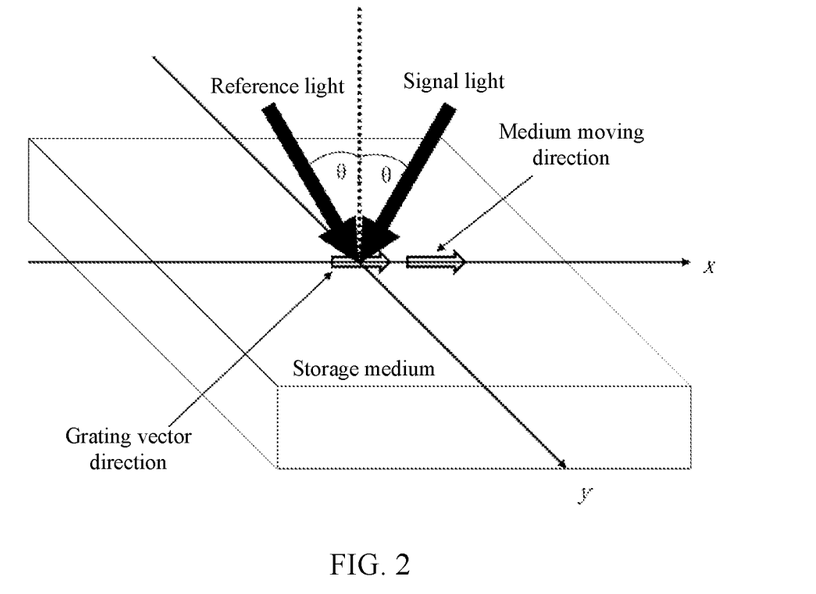
FIG. 2 is a schematic diagram illustrating that a grating vector direction is the same as a medium shift direction in an existing shift multiplexing method.
Figure 3:
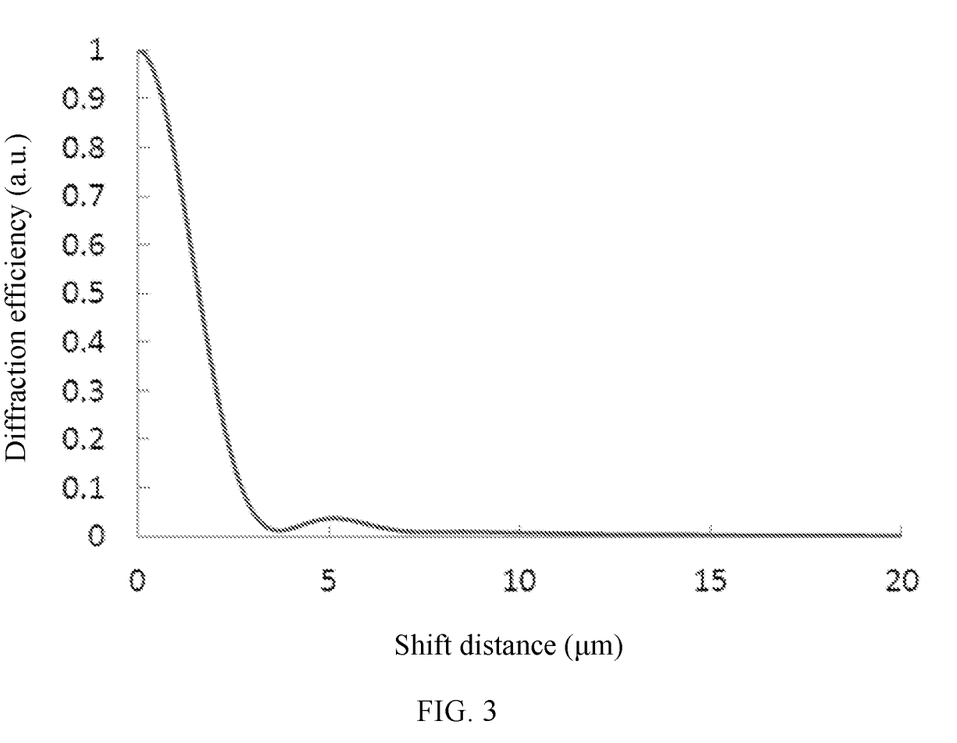
FIG. 3 is a relation curve between the diffraction efficiency and the medium shift amount in an existing shift multiplexing method.

In the specific implementation of the holographic storage method, off-axis holographic storage using spherical wave reference light is one of the most representative storage systems. In this system, the angle between the signal light and the medium normal is generally the same as the angle between the reference light and the medium normal, and the incident plane of the signal light and the reference light coincide. The grating vector direction in the incident plane is determined by the optical axis directions of the signal light and reference light. As shown in FIG. 1, according to the Bragg condition, a signal light wave vector $k_s$, a reference light wave vector $k_r$ and a holographic grating vector $k_g$ form a vector triangle, and the direction of the holographic grating vector $k_g$ points to the reference light. When the medium is moved a short distance after the hologram is recorded, the three vectors no longer form a triangle, the Bragg condition no longer holds, and the original recorded hologram cannot be reproduced, so the next hologram can be recorded to realize shift multiplexed recording. As shown in FIG. 2, in the existing shift multiplexing method, when shift multiplexing is performed, the medium moving direction is the same as the grating vector direction. The calculation result of shift recording selectivity is shown in FIG. 3, and the minimum shift distance is about 3 μm. In this recording method, different holograms can overlap each other for storage, which greatly increases the number of multiplexed recordings, thereby increasing the storage capacity.

Figure 4:
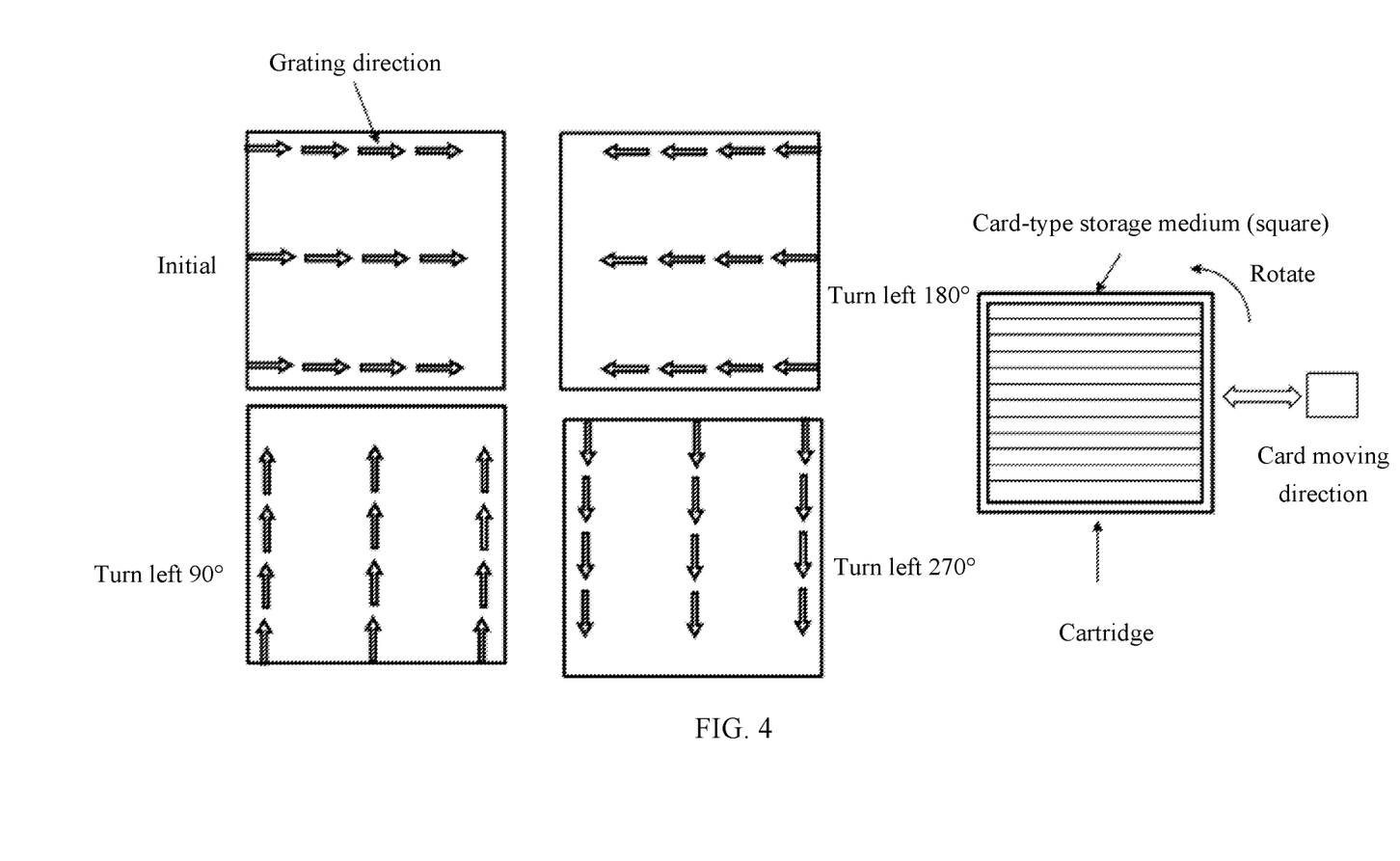
FIG. 4 is a schematic diagram of a cross-shift multiplexing method in existing shift multiplexing storage.
Figure 5:
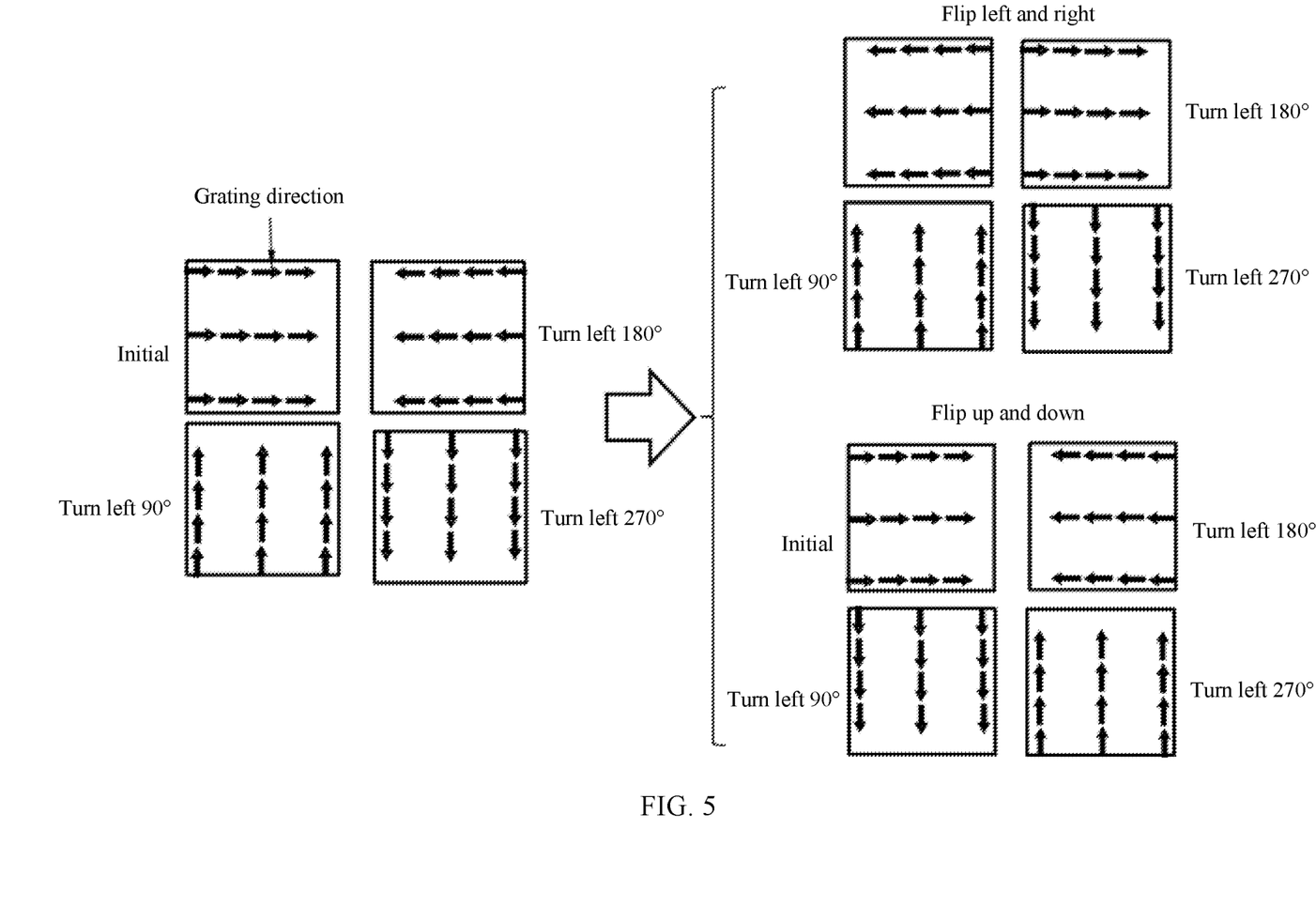
FIG. 5 is a schematic diagram of a change in a grating direction when a storage medium is flipped left and right or up and down in an existing cross-shift multiplexing method.

If a card-type storage medium is used, the cross-shift multiplexing can be performed by rotating the medium 90°. With this cross-overwrite method, a larger storage capacity can be obtained. As shown in FIG. 4, the rotation angles in this method are only 0°, 90°, 180°, and 270°, and the number of cross-shift multiplexing is limited to 4. As shown in FIG. 5, recording can also be performed by flipping the medium left and right or up and down, and the data capacity will be increased again. However, when this multiplexing method is performed, crosstalk is caused because some of the holographic grating vectors face the same direction, which is a major disadvantage in using the card-type medium. Moreover, the performance of the current storage medium allows more shift multiplexed recordings, so a recording method for increasing the shift multiplexing number is required, which can increase the multiplexing number without crosstalk, thereby increasing the signal-to-noise ratio.

SUMMARY

The present invention aims to overcome at least one defect (deficiency) of the prior art and provide a holographic multiplexed recording method for increasing storage capacity, which is used to solve the problem of crosstalk caused by the overlapping of grating vector directions when a storage medium is flipped for multiplexing storage.

The technical solution adopted by the present invention is a holographic multiplexed recording method for increasing storage capacity, including: in a holographic recording and reproducing device, the moving direction of the storage medium is not coplanar with the plane where the optical axes of signal light and reference light are located, or the relative moving direction of the storage medium and the signal light or the reference light is not coplanar with the plane where the optical axes of the signal light and the reference light are located.

Through the method, a certain angle exists between the grating vector direction and the moving direction or the relative moving direction, so that the phenomenon that the grating vector directions are the same does not occur when the medium is subjected to multiplexed recording after being rotated or flipped. Not only is multiplexing number increased, but also crosstalk caused by the same grating vector direction is prevented.

Specifically, the storage medium rotates with its surface normal as an axis, so that the moving direction thereof forms an angle φ with the plane where the optical axes of the signal light and the reference light are located, and φ is from 5° to 45°. φ is preferably 30°.

In the method of the present invention, a two-dimensional hologram array is further obtained by arranging and recording multiple rows of holograms in parallel, then a new hologram array is multiplexed and recorded after the storage medium is rotated at a fixed angle, and the fixed angle is called a cross angle α.

The recording process specifically includes the following steps:

S1. recording the two-dimensional hologram array by means of shift multiplexing;

S2. rotating the storage medium at the cross angle α with its surface normal as the axis; and S3. repeating steps S1 and S2 n times, performing cross-shift multiplexing storage, and ending when n=[360°/α]−1 is satisfied, where [360°/α] means rounding 360°/α.

The steps above describe the recording of the new hologram array by rotating the storage medium at the fixed angle. That is, every time the storage medium rotates at the cross angle α, it re-records a two-dimensional hologram array and performs cross-shift multiplexing storage until rotation is performed by an integer multiple of 360°/α minus 1, and cross-shift multiplexing storage is stopped.

The cross angle α is equal to or greater than 40°. The cross angle is preferably equal to 360°/m, where m is an integer from 1 to 9; and is preferably 90°.

The method of the present invention further includes: recording and reproducing a new hologram from the back after the storage medium is flipped. Specific steps in the recording process are as follows:

S1. recording the two-dimensional hologram array by means of shift multiplexing;

S2. rotating the storage medium at the cross angle α with its surface normal as the axis;

S3. repeating steps S1 and S2 n times, and ending the recording on a first side of the storage medium when n=[360°/α]−1 is satisfied;

S4. flipping the storage medium with an axis perpendicular or parallel to the moving direction; and S5. repeating steps S1 to S3 on a second side of the storage medium.

That is, the medium is rotated at a fixed angle for cross-shift multiplexing storage, and then the medium is flipped for repeated cross-shift multiplexing storage.

The reference light and the signal light in this method may be incident symmetrically or asymmetrically with respect to the storage medium. When the reference light and the signal light are incident asymmetrically, the direction of a holographic grating vector formed by the interference between the reference light and the signal light on the storage medium forms an angle with the surface of the storage medium, and the foregoing cross-shift multiplexing storage process is repeated. The grating vector obtained by asymmetric incidence is obliquely incident into the storage medium for holographic recording, which further increases the multiplexing storage capacity.

In this method, the storage medium can be inclined. The direction of the holographic grating vector formed by the interference between the reference light and the signal light on the storage medium forms an angle with the surface of the storage medium, and the foregoing cross-shift multiplexing storage process is repeated, which further increases the multiplexing number.

The reference light in this method can be spherical converging light.

The present invention also provides a storage medium, including a multilayer-multiplexed two-dimensional hologram array, where the two-dimensional hologram array includes an X-axis direction and a Y-axis direction, and each layer includes the recording of arranging multiple rows of holograms in parallel along the X-axis direction, the projection, on a storage medium plane, of a holographic grating vector formed by the interference between the reference light and the signal light on the storage medium forms an acute angle φ with the X-axis or Y-axis, and φ is from 5° to 45°.

A fixed angle α exists between the projections of holographic grating vectors of each layer of the storage medium on the storage medium plane, and α is equal to or greater than 40°.

The storage medium may be a storage medium obtained after recording by using the foregoing method.

The present invention also provides a holographic recording and reproducing device for recording and reproducing a signal on a storage medium, including: a recording unit, configured to generate signal light and reference light; a storage medium moving unit, configured to drive the storage medium to move so that the moving direction of the storage medium is not coplanar with the plane where the optical axes of the signal light and the reference light are located; a storage medium rotating unit, configured to drive the storage medium to rotate with its plane normal as an axis; and a storage medium flipping unit, configured to drive the storage medium to flip with an axis perpendicular or parallel to the moving direction.

The device further includes a storage medium tilting unit, configured to drive the storage medium to tilt.

The recording unit in the device includes a reference light deflecting device or a signal light deflecting device that changes the incident angle of the reference light or the signal light to make it incident asymmetrically.

The foregoing method and the foregoing storage medium can be implemented and obtained by using the device.

Compared with the prior art, the present invention has the following beneficial effects: According to the holographic multiplexed recording method for increasing storage capacity provided by the present invention, because the moving direction of the storage medium is not coplanar with the plane where the optical axes of the signal light and the reference light are located, or the relative moving direction of the storage medium and the signal light or the reference light is not coplanar with the plane where the optical axes of the signal light and the reference light are located, omnidirectional cross-shift multiplexing of the storage medium is implemented by rotating, flipping or tilting the storage medium, which greatly improves the number of multiplexed recordings and increases the storage capacity of the storage medium. Moreover, in the entire cross-shift multiplexing storage, after each multiplexing, the holographic grating vector direction is not repeated, and crosstalk will not occur, which increases the signal-to-noise ratio.

DESCRIPTION OF EMBODIMENTS

The accompanying drawings of the present invention are only for exemplary description and cannot be construed as limiting the present invention. The technical solution of the present invention will be further described below by taking a rectangular storage medium as an example.

Embodiment 1

Figure 7:
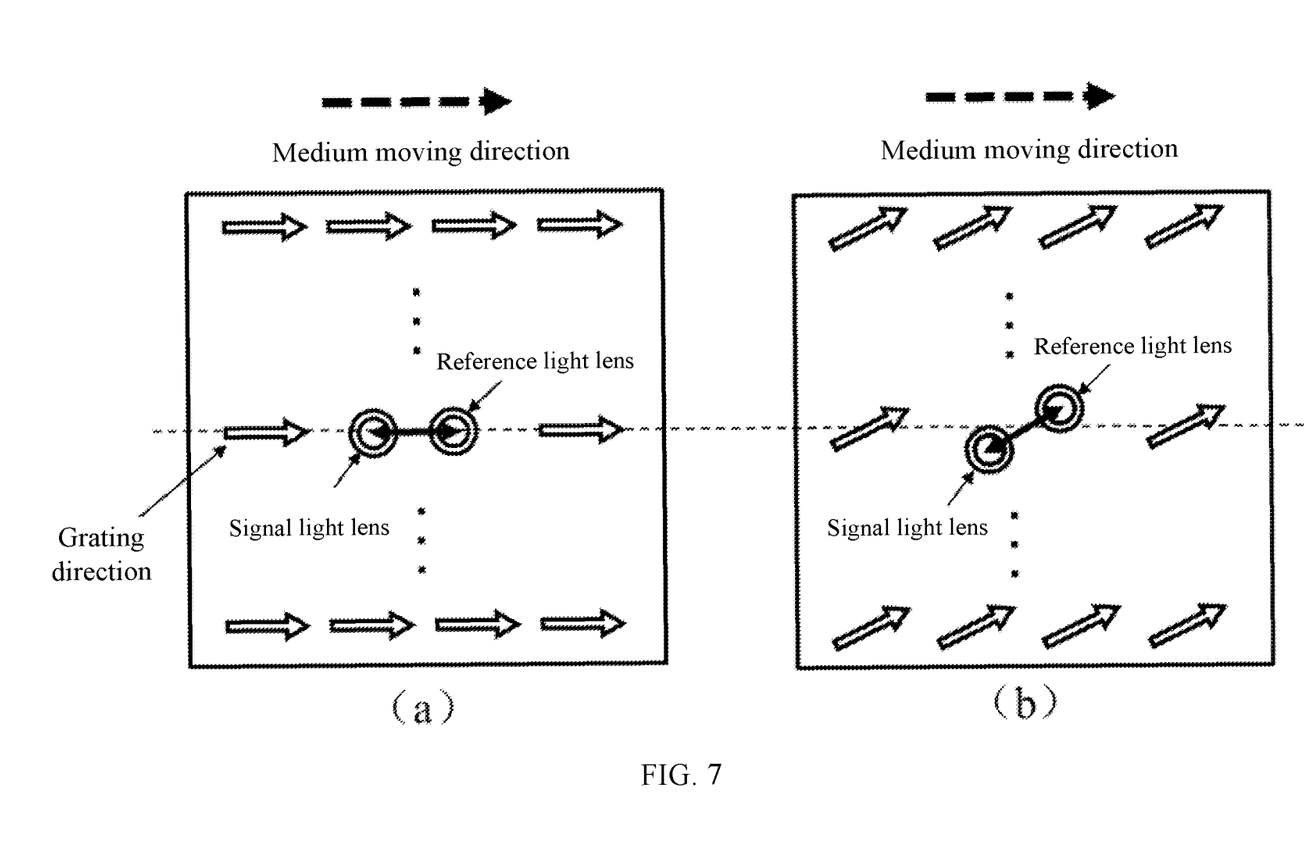
FIG. 7 is a schematic diagram illustrating the difference between a shift multiplexing method of the present invention and an existing shift multiplexing method.

This embodiment provides a holographic multiplexed recording method for increasing storage capacity. Spherical converging light is used as reference light. In a holographic recording and reproducing device, the moving direction of a storage medium is not coplanar with the plane where the optical axes of signal light and reference light are located, or the relative moving direction of the storage medium and the signal light or the reference light is not coplanar with the plane where the optical axes of the signal light and the reference light are located. With this method, during shift multiplexing, the medium moving direction is constant. As shown in FIG. 7, a grating vector direction of this embodiment is different from an existing one.

Figure 6:
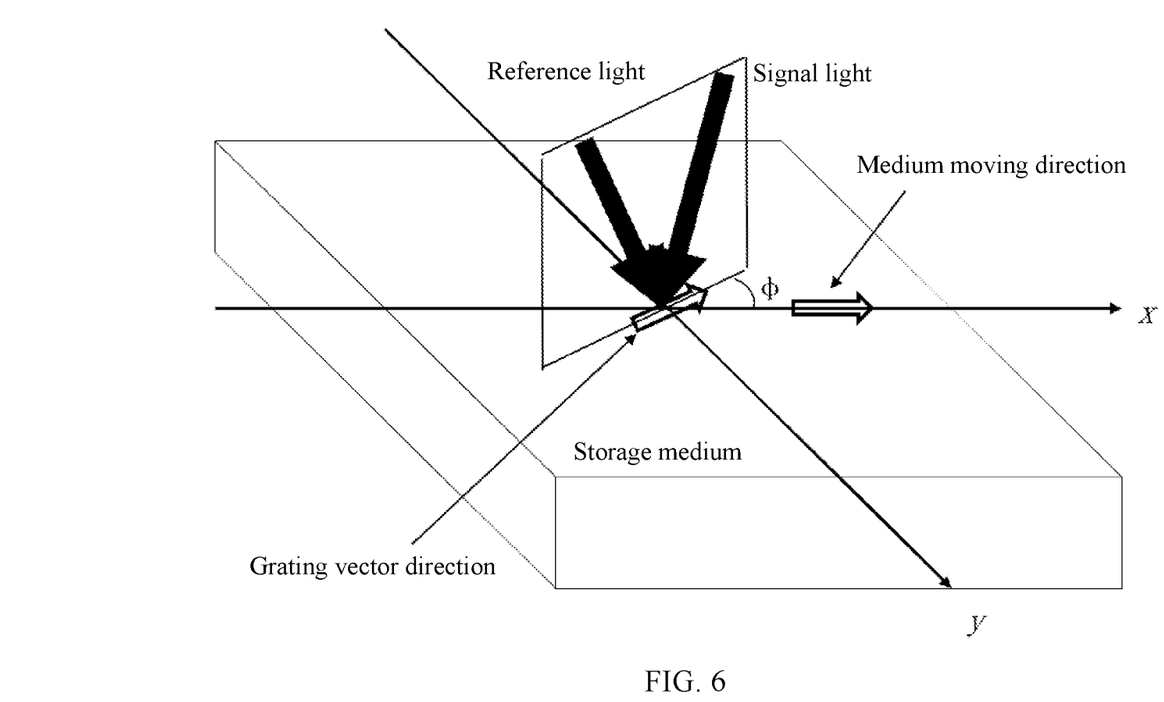
FIG. 6 is a schematic diagram illustrating that a grating vector direction is different from a medium shift direction in shift multiplexing storage of the present invention.
Figure 8:
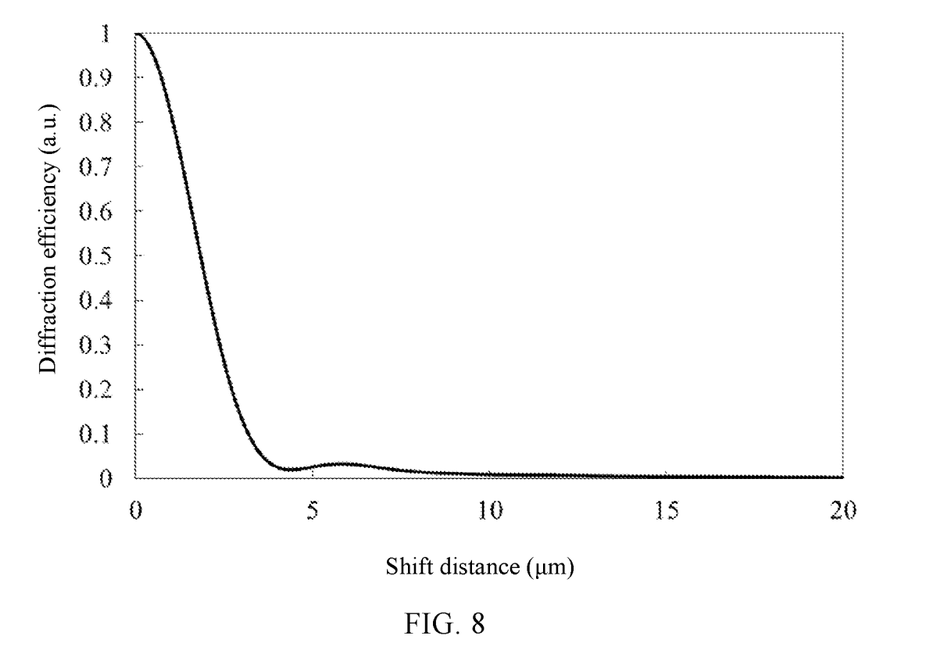
FIG. 8 is a relation curve between the diffraction efficiency and the medium shift amount when a grating vector direction deviates from a medium shift direction by 30 degrees.
Figure 9:
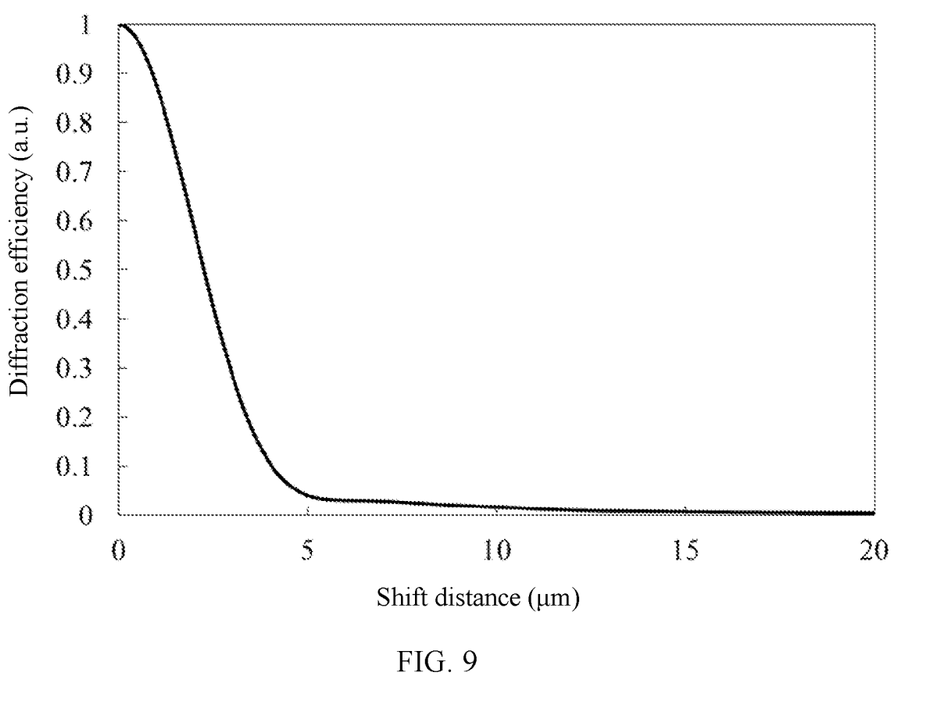
FIG. 9 is a relation curve between the diffraction efficiency and the medium shift amount when a grating vector direction deviates from a medium shift direction by 45 degrees.

As shown in FIG. 6, the storage medium rotates with its surface normal as an axis, so that the moving direction thereof forms an angle φ with the plane where the optical axes of the signal light and the reference light are located, and φ is from 5° to 45°. If this recording method is adopted, when the angle φ between the grating vector and the shift direction is 30°, the minimum shift distance is 4 μm, and the specific relation curve between the diffraction efficiency and shift distance is shown in FIG. 8. When the angle φ between the grating vector and the shift direction is 45°, the minimum shift distance is 10 μm, and the specific relation curve between the diffraction efficiency and the shift distance is shown in FIG. 9. The results show that the minimum shift distance in the range of φ=30° has a small change with respect to the minimum shift distance 3 μm in the existing shift multiplexed recording method shown in FIG. 3. Therefore, in the case of ensuring more multiplexing numbers, the angle φ between the grating vector and the shift direction is preferably 30°, and φ used in this embodiment is 30°.

In the holographic multiplexed recording method according to this embodiment, a two-dimensional hologram array is further obtained by arranging and recording multiple rows of holograms in parallel, then a new hologram array is multiplexed and recorded after the storage medium is rotated at a fixed angle, and the fixed angle is called a cross angle α. The following specific steps are adopted.

S1. Record the two-dimensional hologram array by means of shift multiplexing.

S2. Rotate the storage medium at the cross angle α with its surface normal as the axis.

S3. Repeat steps S1 and S2 n times, perform cross-shift multiplexing storage, and end when n=[360°/α]−1 is satisfied, where [360°/α] means rounding 360°/α. The cross angle α may be equal to or greater than 40°. The cross angle is preferably equal to 360°/m, where m is an integer from 1 to 9.

The holographic multiplexed recording method according to this embodiment further includes: recording and repro-ducing a new hologram from the back after the storage medium is flipped. Specific steps in the recording process are as follows:

S1. Record the two-dimensional hologram array by means of shift multiplexing;

S2. Rotate the storage medium at the cross angle α with its surface normal as the axis.

S3. Repeat steps S1 and S2 n times, and end the recording on a first side of the storage medium when n=[360°/α]−1 is satisfied.

S4. Flip the storage medium with an axis perpendicular or parallel to the moving direction.

S5. Repeat steps S1 to S3 on a second side of the storage medium.

In this embodiment, the cross angle α is 90°, the storage medium is rotated by 0°, 90°, 180°, and 270° successively to perform cross-shift multiplexing, and the result is shown in FIG. 11(a). The cross-shift multiplexing storage process is then repeated after the storage medium is flipped up and down or left and right, and the result is shown in FIG. 11(b). It can be seen that the vector directions of all holographic gratings are different, that is, crosstalk will not be caused by the same grating direction, and the storage medium can be cross-overwritten a total of eight times, realizing an increase in the storage capacity.

Figure 10:
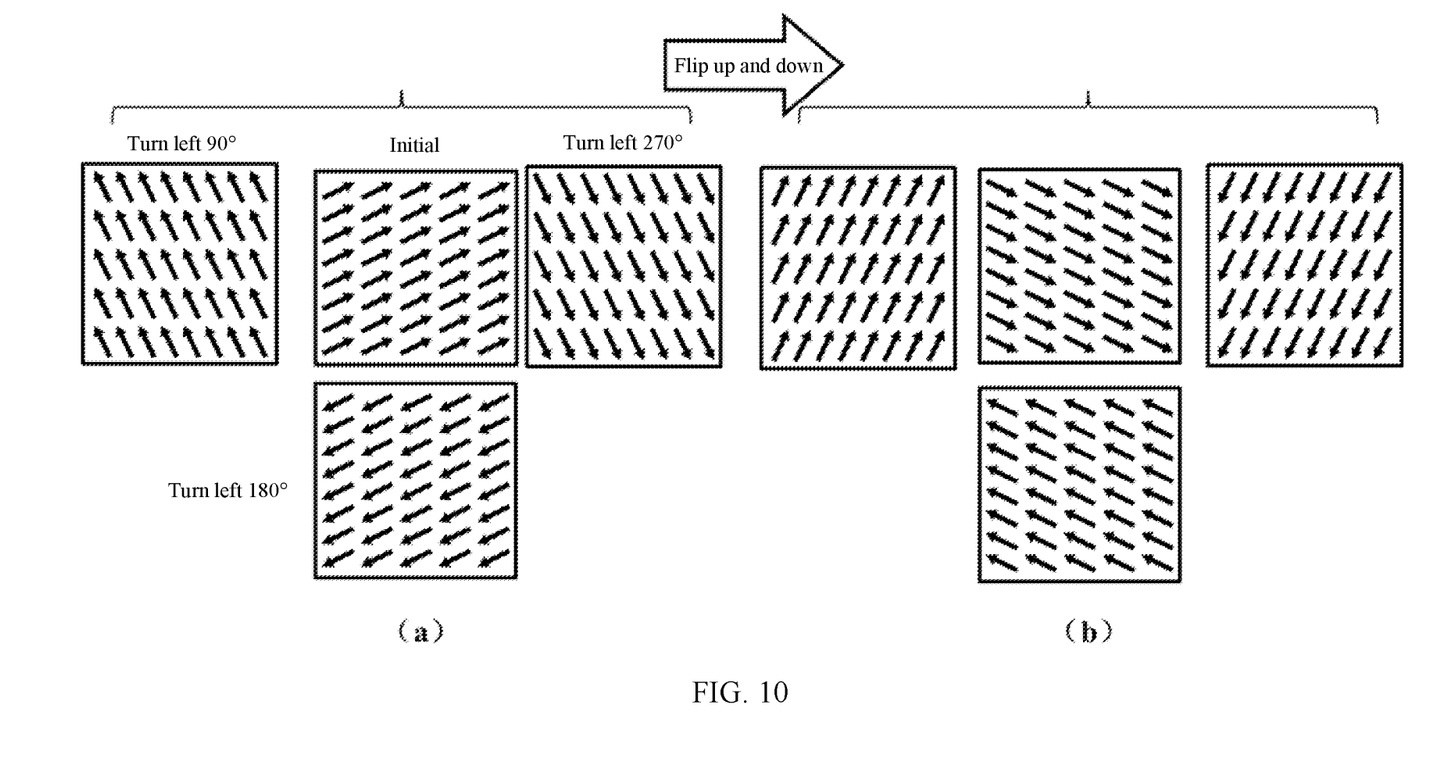
FIG. 10 illustrates a change in a grating direction when a storage medium is flipped horizontally or vertically when a cross-shift multiplexing storage method is applied in the present invention.

According to this embodiment, as shown in FIG. 10, tilting the storage medium, or making the reference light and the signal light incident asymmetrically with respect to the storage medium, so that the direction of the holographic grating vector formed by the interference between the reference light and the signal light on the storage medium forms an angle with the surface of the storage medium, and successively rotating or flipping the storage medium for cross-shift multiplexed recording can further increase the multiplexing number.

The method of this embodiment is used for holographic multiplexing. Omnidirectional cross-shift multiplexing of the storage medium is implemented by rotating, flipping, and tilting the storage medium, which can greatly improve the number of multiplexed recordings and increase the storage capacity of the storage medium. Moreover, in the entire cross-shift multiplexing storage, after each multiplexing, the holographic grating vector direction is not repeated, and crosstalk will not occur, which increases the signal-to-noise ratio.

This embodiment takes a rectangular storage medium as an example, but it is not limited thereto. Disk-type storage media of other shapes, such as optical disks, are also applicable.

Embodiment 2

Figure 11:
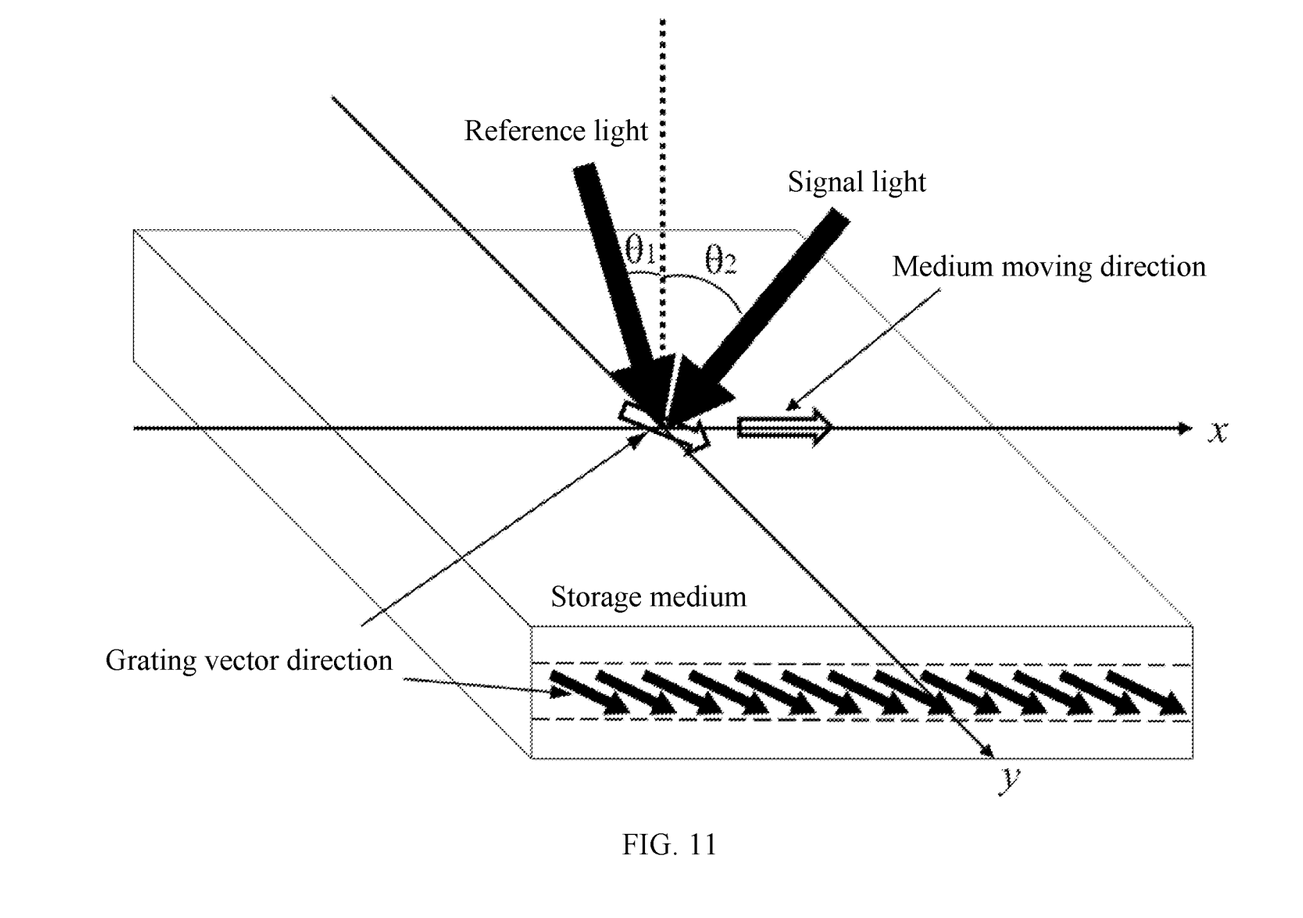
FIG. 11 is a schematic diagram of a shift multiplexing method for asymmetric incidence of light beams of the present invention.

This embodiment provides a storage medium, including a multilayer-multiplexed two-dimensional hologram array. As shown in FIGS. 6 and 11, the two-dimensional hologram array includes an X-axis direction and a Y-axis direction, each layer includes the recording of arranging multiple rows of holograms in parallel along the X-axis direction, the projection, on a storage medium plane, of the holographic grating vector formed by the interference between the reference light and the signal light on the storage medium forms an acute angle φ with the X-axis or Y-axis, and φ is from 5° to 45°. As shown in FIG. 10, in this embodiment, φ is 30°.

A fixed angle α exists between the projections of holographic grating vectors of each layer of the storage medium on the storage medium plane, and α is equal to or greater than 40°. As shown in FIG. 10, in this embodiment, α is 90°.

The storage medium may be a storage medium obtained after recording by using the method of Embodiment 1.

Embodiment 3

Figure 12:
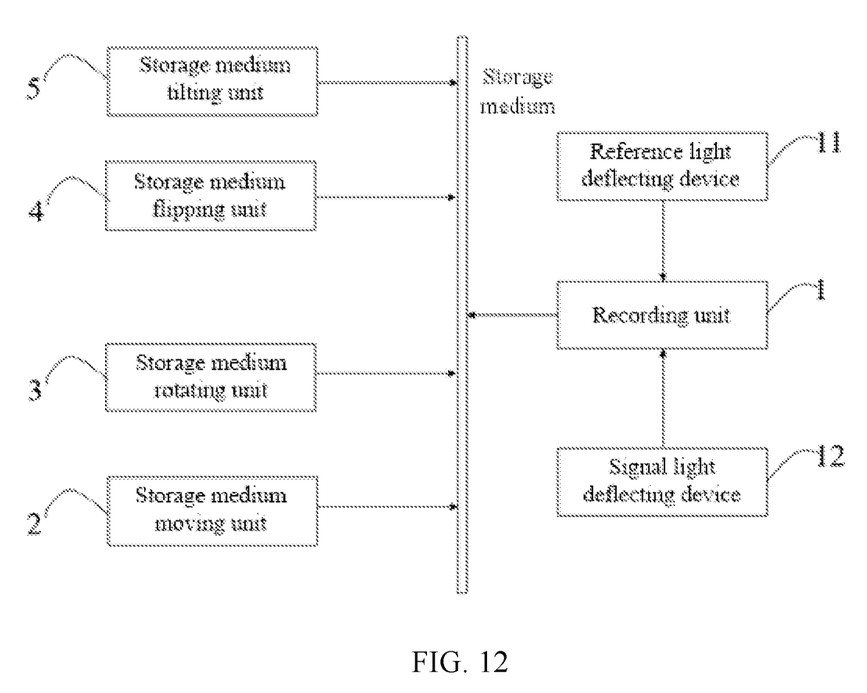
FIG. 12 is a schematic diagram of a holographic recording and reproducing device of the present invention.

This embodiment also provides a holographic recording and reproducing device for recording and reproducing a signal on a storage medium, as shown in FIG. 12, including: a recording unit 1, configured to generate signal light and reference light; a storage medium moving unit 2, configured to drive the storage medium to move so that the moving direction of the storage medium is not coplanar with the plane where the optical axes of the signal light and the reference light are located; a storage medium rotating unit 3, configured to drive the storage medium to rotate with its plane normal as an axis; and a storage medium flipping unit 4, configured to drive the storage medium to flip with an axis perpendicular or parallel to the moving direction.

The device provided in this embodiment further includes a storage medium tilting unit 5, configured to drive the storage medium to tilt.

The recording unit in the device provided in this embodiment includes a reference light deflecting device 11 or a signal light deflecting device 12 that changes the incident angle of the reference light or the signal light to make it incident asymmetrically.

The method according to Embodiment 1 and the storage medium according to Embodiment 2 can be obtained by using the device according to this embodiment.

Apparently, the above-mentioned embodiments of the present invention are merely examples to clearly illustrate the technical solutions of the present invention, and are not intended to limit the specific embodiments of the present invention. Any modifications, equivalent substitutions, and improvements, etc. made within the spirit and scope of the claims of the present invention shall fall within the protection scope of the claims of the present invention.

What is claimed is:

1. A holographic multiplexed recording method for increasing storage capacity, wherein in a holographic recording and reproducing device, a moving direction of a storage medium is not coplanar with a plane where an optical axis of signal light and reference light are located, or a relative moving direction of a storage medium and signal light or reference light is not coplanar with a plane where an optical axis of the signal light and the reference light are located, and wherein the storage medium rotates with its surface normal as an axis, so that the moving direction thereof forms an angle φ with the plane where the optical axes of the signal light and the reference light are located, and φ is from 5° to 45°.

2. The holographic multiplexed recording method according to claim 1, wherein the angle φ formed by the moving direction of the storage medium and the plane where the optical axes of the signal light and the reference light are located is 30°.

3. The holographic multiplexed recording method according to claim 1, wherein a two-dimensional hologram array can be obtained by arranging and recording multiple rows of holograms in parallel, then a new hologram array can be multiplexed and recorded after the storage medium is rotated at a fixed angle, and the fixed angle is called a cross angle α.

4. The holographic multiplexed recording method according to claim 3, wherein the recording process specifically comprises the following steps:
S1. recording the two-dimensional hologram array by means of shift multiplexing;
S2. rotating the storage medium at the cross angle α with its surface normal as the axis; and
S3. repeating steps S1 and S2 n times, and ending when n=[360°/α]−1 is satisfied.

5. The holographic multiplexed recording method according to claim 3, wherein the cross angle α at which the storage medium rotates is equal to or greater than 40°.

6. The holographic multiplexed recording method according to claim 5, wherein the cross angle α=360°/m, and m is an integer from 1 to 9.

7. The holographic multiplexed recording method according to claim 6, wherein the cross angle α is 90°.

8. The holographic multiplexed recording method according to claim 1, wherein a new hologram is recorded and reproduced from the back after the storage medium is flipped.

9. The holographic multiplexed recording method according to claim 8, wherein the recording process specifically comprises the following steps:
S1. recording the two-dimensional hologram array by means of shift multiplexing;
S2. rotating the storage medium at the cross angle α with its surface normal as the axis;
S3. repeating steps S1 and S2 n times, performing cross-shift multiplexing storage, and ending the recording on a first side of the storage medium when n=[360°/α]−1 is satisfied;
S4. flipping the storage medium with an axis perpendicular or parallel to the moving direction; and
S5. repeating steps S1 to S3 on a second side of the storage medium.

10. The holographic multiplexed recording method according to claim 1, wherein the new hologram is recorded and reproduced by tilting the medium or making the reference light and signal light incident asymmetrically with respect to the storage medium, and a holographic grating vector formed by the interference between the reference light and the signal light on the storage medium forms an angle with the surface of the storage medium.

11. The holographic multiplexed recording method according to claim 10, wherein the recording process specifically comprises the following steps:
S1. recording the two-dimensional hologram array by means of shift multiplexing;
S2. rotating the storage medium at the cross angle α with its surface normal as the axis;
S3. repeating steps S1 and S2 n times, performing cross-shift multiplexing storage, and ending the recording on a first side of the storage medium when n=[360°/α]−1 is satisfied;
S4. flipping the storage medium with an axis perpendicular or parallel to the moving direction; and
S5. repeating steps S1 to S3 on a second side of the storage medium.

12. A storage medium, comprising a multilayer-multiplexed two-dimensional hologram array, wherein the two-dimensional hologram array comprises an X-axis direction and a Y-axis direction, each layer comprises the recording of arranging multiple rows of holograms in parallel along the X-axis direction, the projection, on a storage medium plane, of a holographic grating vector formed by the interference between reference light and signal light on the storage medium forms an acute angle $\varphi$ with the X-axis or Y-axis, and $\varphi$ is from 5° to 45°.

13. The storage medium according to claim 12, wherein a fixed angle $\alpha$ exists between the projections of holographic grating vectors of each layer on the storage medium plane, and $\alpha$ is equal to or greater than 40°.

14. A holographic recording and reproducing device for recording and reproducing a signal on a storage medium, comprising:
   a recording unit, configured to generate signal light and reference light;
   a storage medium moving unit, configured to drive the storage medium to move so that the moving direction of the storage medium is not coplanar with the plane where the optical axes of the signal light and the reference light are located;
   a storage medium rotating unit, configured to drive the storage medium to rotate with its plane normal as an axis; and
   a storage medium flipping unit, configured to drive the storage medium to flip with an axis perpendicular or parallel to the moving direction.

15. The holographic recording and reproducing device according to claim 14, further comprising a storage medium tilting unit, configured to drive the storage medium to tilt.

16. The holographic recording and reproducing device according to claim 14, wherein the recording unit comprises a reference light deflecting device or a signal light deflecting device that changes the incident angle of the reference light or the signal light to make it incident asymmetrically.

* * * * *